F. E. SEDDON & W. H. DOUGLAS.
POWER TRANSMISSION MECHANISM.
APPLICATION FILED SEPT. 19, 1907. RENEWED SEPT. 2, 1908.

917,968.

Patented Apr. 13, 1909.
6 SHEETS—SHEET 4.

WITNESSES:

INVENTORS
Frederick E. Seddon
William H. Douglas
BY
ATTORNEYS.

F. E. SEDDON & W. H. DOUGLAS.
POWER TRANSMISSION MECHANISM.
APPLICATION FILED SEPT. 19, 1907. RENEWED SEPT. 2, 1908.

917,968.

Patented Apr. 13, 1909.
6 SHEETS—SHEET 6.

WITNESSES
Johua Bergstrom
Theo. G. Hoster

INVENTORS
Frederick E. Seddon
William H. Douglas
BY Munn & Co
ATTORNEYS

UNITED STATES PATENT OFFICE.

FREDERICK E. SEDDON, OF HOBOKEN, AND WILLIAM H. DOUGLAS, OF BELLEVILLE, NEW JERSEY.

POWER-TRANSMISSION MECHANISM.

No. 917,968.  Specification of Letters Patent.  Patented April 13, 1909.

Application filed September 19, 1907, Serial No. 393,648. Renewed September 2, 1908. Serial No. 451,354.

*To all whom it may concern:*

Be it known that we, FREDERICK E. SEDDON, a citizen of the United States, and a resident of Hoboken, in the county of Hudson and State of New Jersey, and WILLIAM H. DOUGLAS, a citizen of the United States, and a resident of Belleville, in the county of Essex and State of New Jersey, have invented a new and Improved Power-Transmission Mechanism, of which the following is a full, clear, and exact description.

The object of the invention is to provide a new and improved power transmission mechanism for use on automobiles and other vehicles and mechanisms requiring a varying and differential action in either direction, and arranged to allow forward or backward driving at any desired speed without reversing or changing the speed of the motor, and to permit the driven wheels to run at a differential speed when the vehicle turns around a corner or in a sinuous track.

The invention consists of novel features and parts and combinations of the same, which will be more fully described hereinafter and then pointed out in the claims.

A practical embodiment of the invention is represented in the accompanying drawings forming a part of this specification in which similar characters of reference indicate corresponding parts in all the views.

Figure 1:
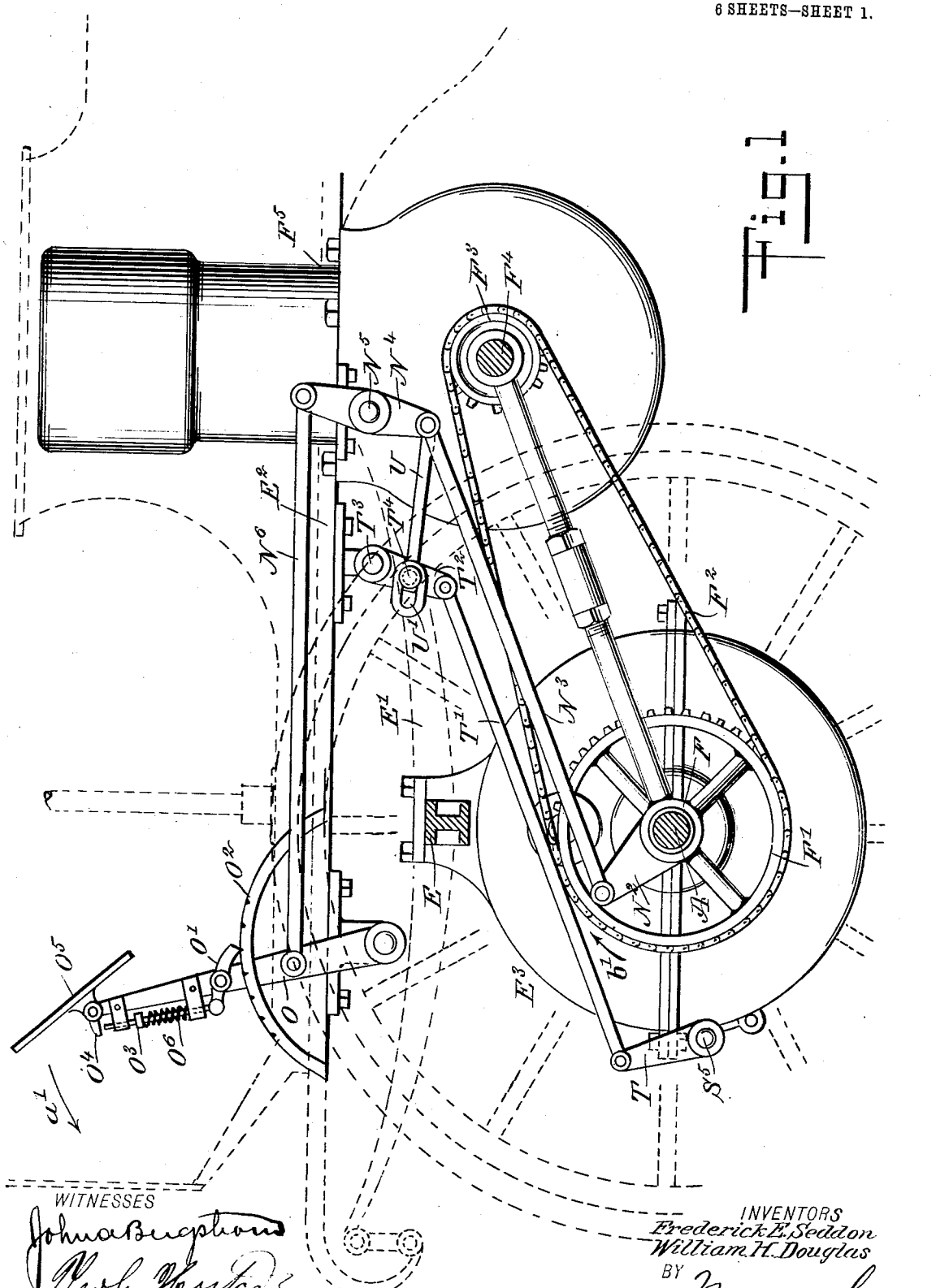
Figure 2:
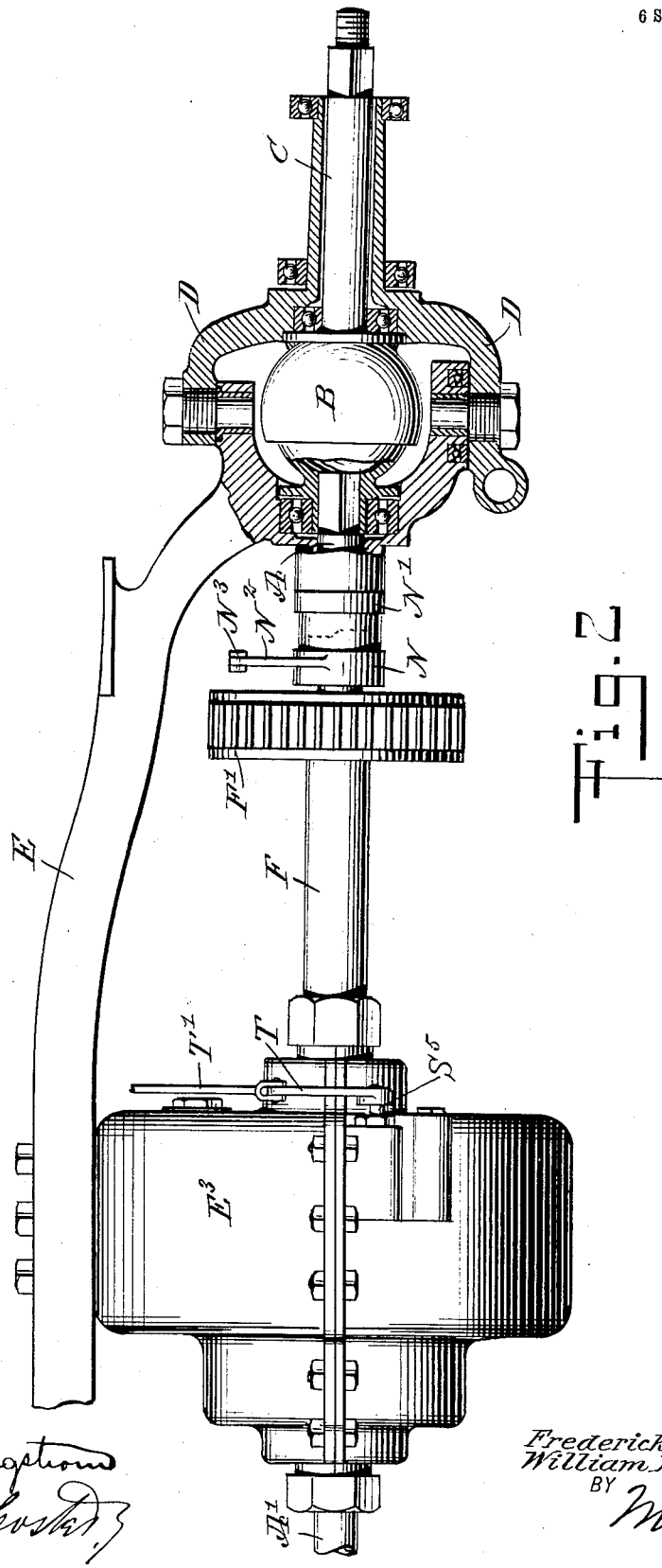
Figure 3:
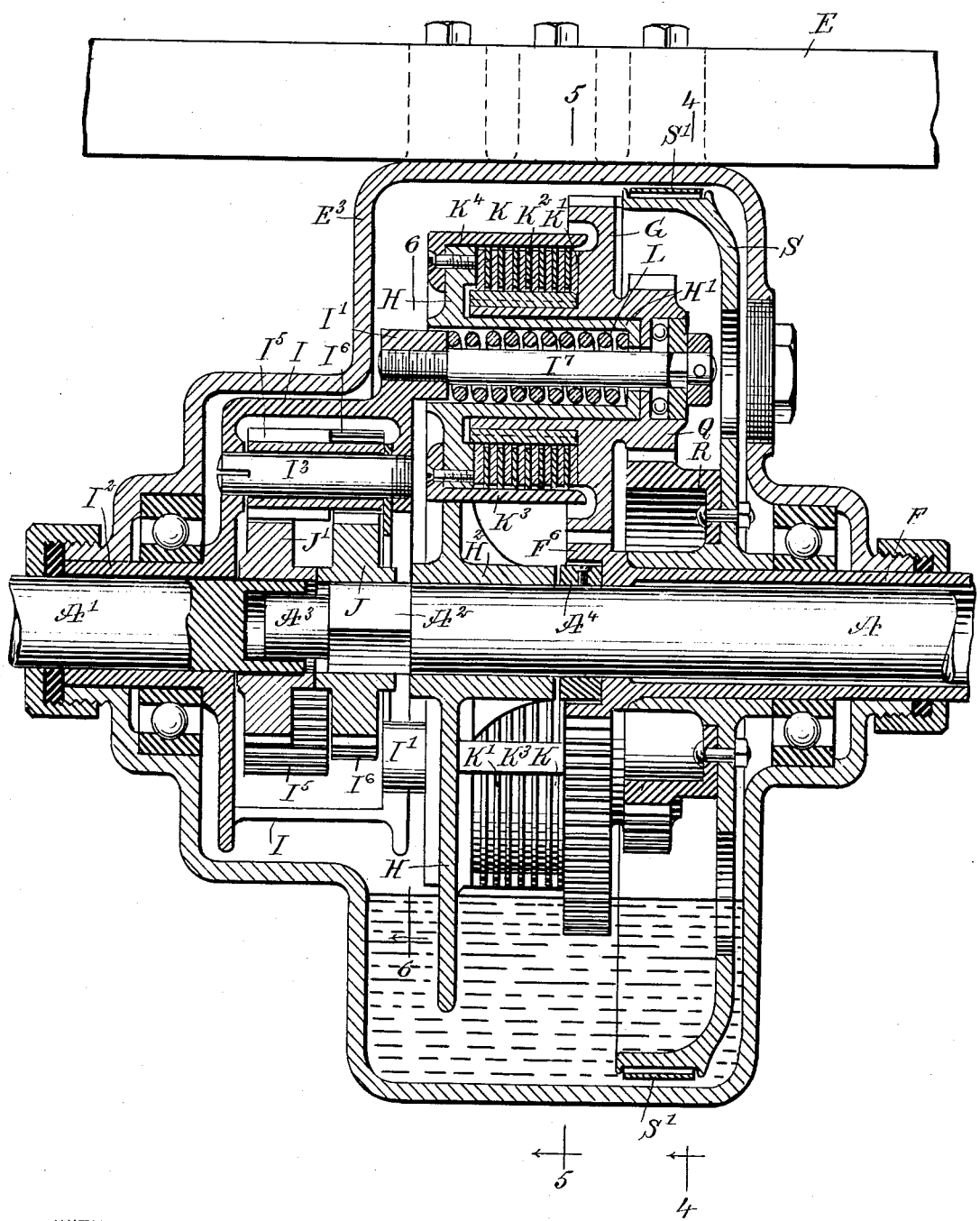
Figure 4:
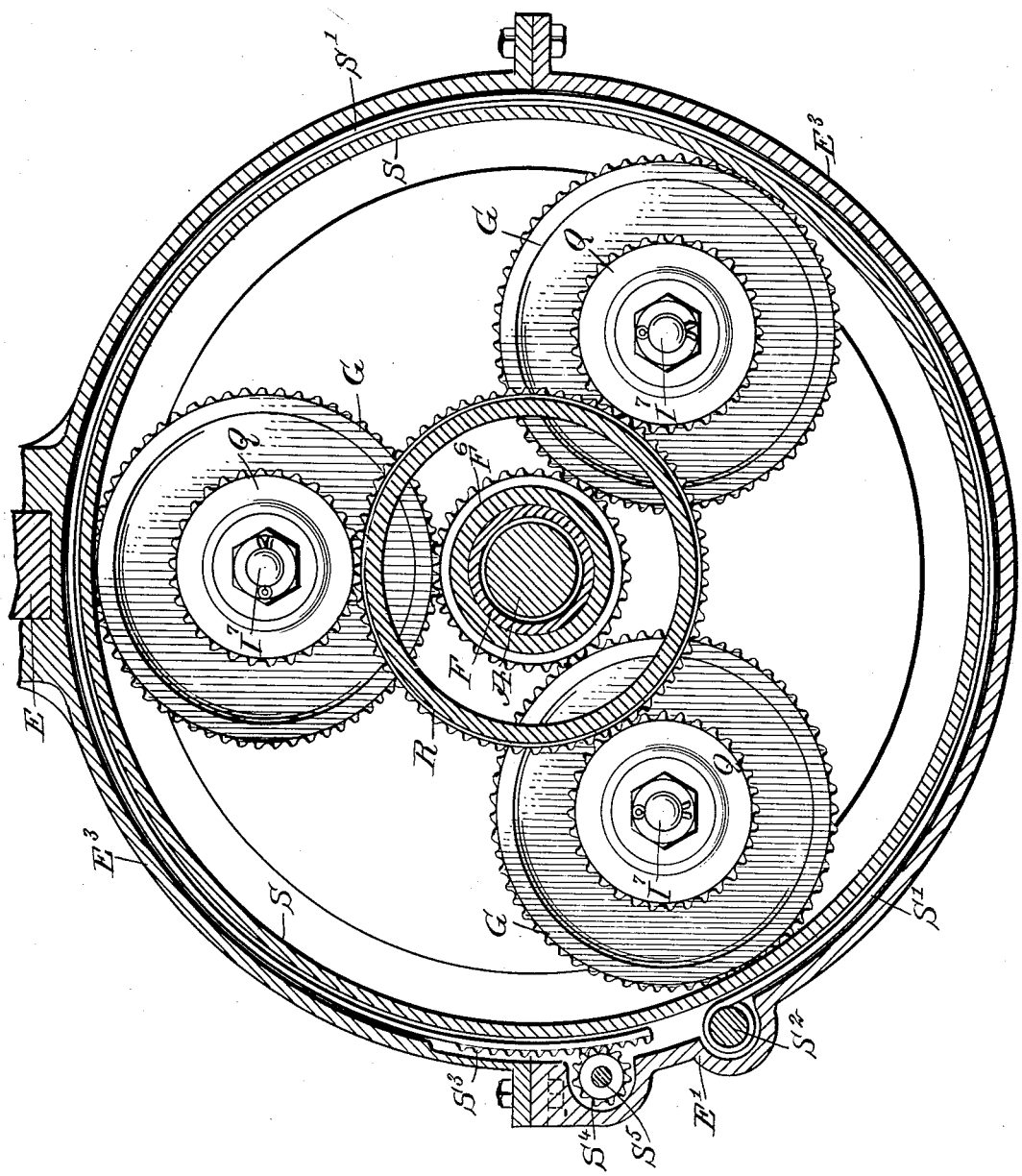
Figure 5:
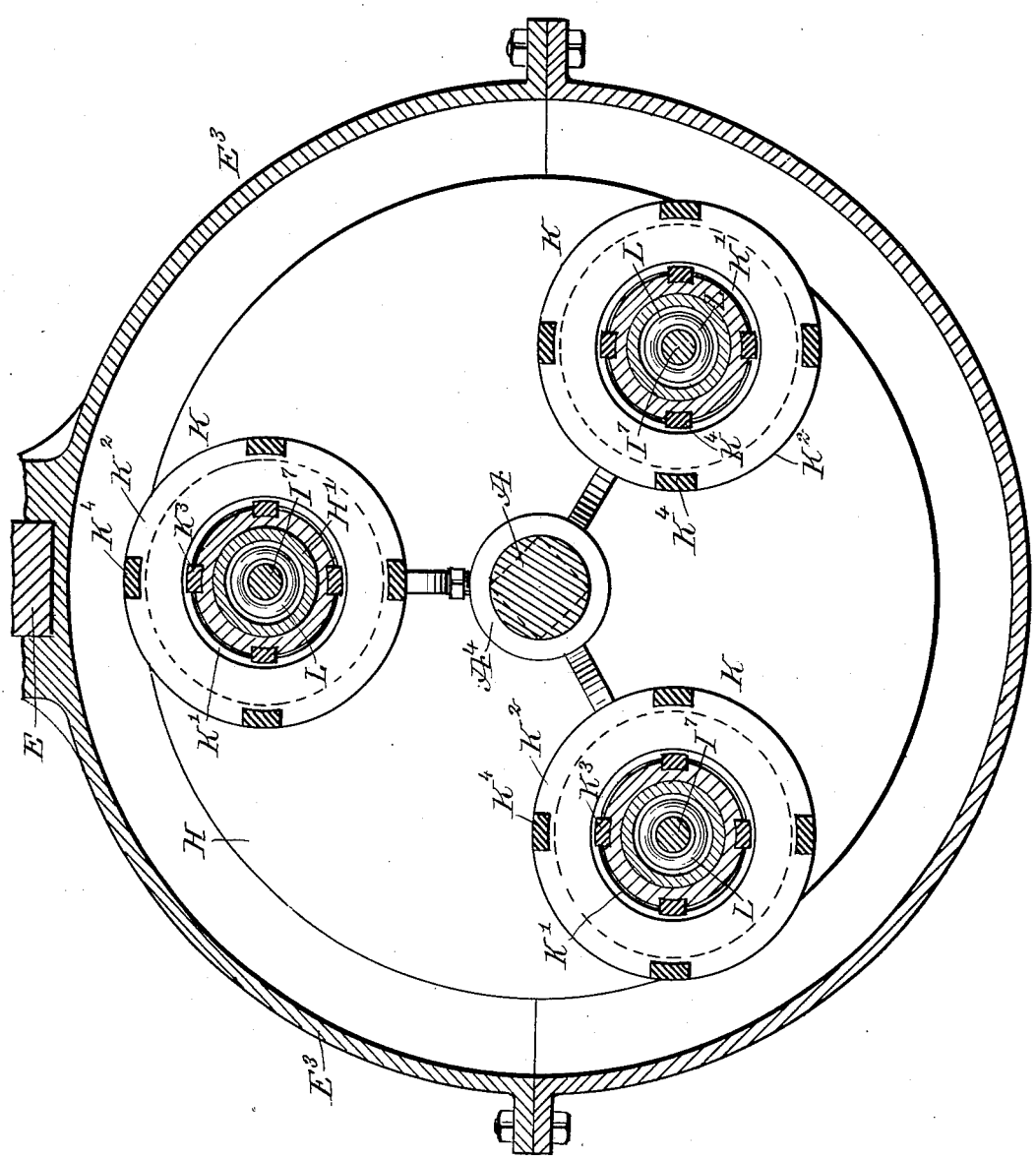
Figure 6:
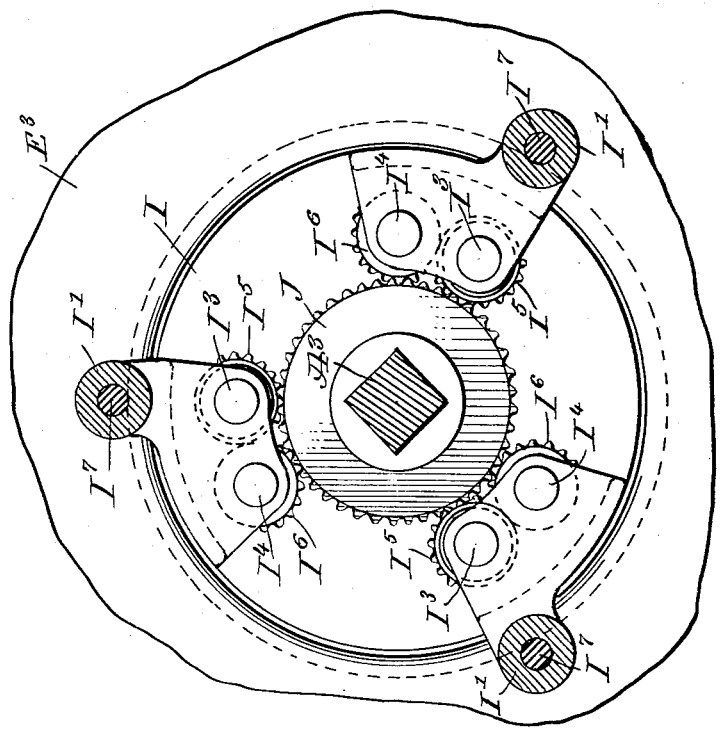
Figure 7:
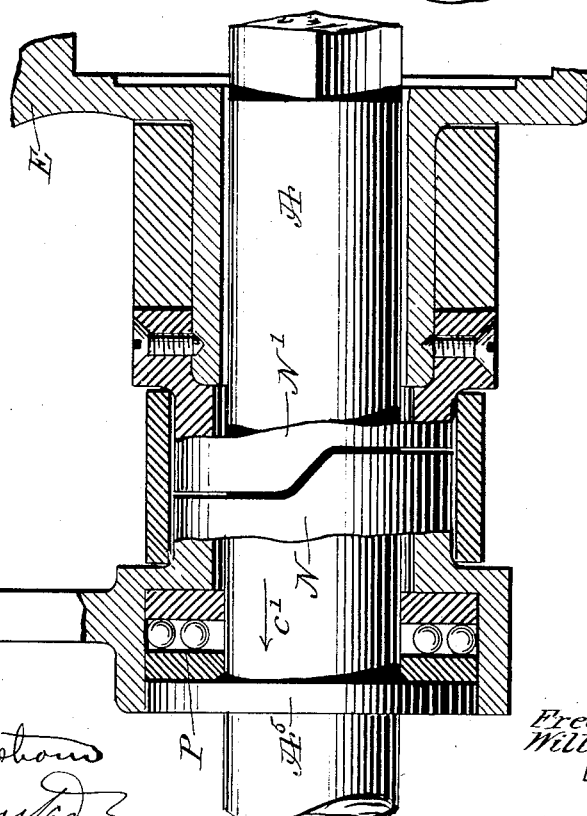

Figure 1 is a sectional side elevation of the improvement as applied to a motor vehicle; Fig. 2 is a transverse section of the same, parts being shown in elevation; Fig. 3 is an enlarged cross section of the gearing; Fig. 4 is a sectional side elevation of the same on the line 4—4 of Fig. 3; Fig. 5 is a like view of the same on the line 5—5 of Fig 3; Fig. 6 is a similar view of the same on the line 6—6 of Fig. 3, and showing more particularly the differential gearing, and Fig. 7 is an enlarged cross section of the controlling mechanism.

The power transmission mechanism illustrated in the drawings is shown applied to the front end of the motor vehicle, and is provided with the alined driven shafts A and A', each connected at its outer end by a universal joint B with the wheel shaft C carrying a front wheel. Each wheel shaft C is journaled in a stub axle D fulcrumed on the main axle or supporting bar E attached to the springs E' of the main frame $E^2$ of the vehicle, and the said stub axles D are connected with the steering gear for steering the vehicle in the usual manner. The driven shaft A extends through a hollow driving shaft F provided with a sprocket wheel F', connected by a sprocket chain $F^2$ with a sprocket wheel $F^3$ secured on the shaft $F^4$ of a motor $F^5$ mounted on the main frame $E^2$ of the vehicle, and serving to rotate the shaft F continually in one direction and practically at the same rate of speed. Other means for driving the shaft F from the motor $F^5$ may be employed.

On the inner end of the driving shaft F is secured or formed a pinion $F^6$ in mesh with one or more gear wheels G loosely journaled on hollow bearings H' projecting from the face of a power transmission member H in the form of a disk or a spider, and having the hub $H^2$ mounted to rotate loosely on the driven shaft A. Into the hollow bearings H' of the transmission member H extend lugs I' formed on a spider I having its hub $I^2$ mounted to rotate loosely on the driven shaft A', as plainly indicated in Fig. 3. The spider I is provided with one or more sets of studs $I^3$, $I^4$ (see Fig. 6), on which are mounted to rotate loosely pinions $I^5$, $I^6$, respectively, in mesh with gear wheels J and J', of which the gear wheel J is rigidly attached to the polygonal portion $A^2$ of the driven shaft A, while the gear wheel J' is rigidly secured to the inner end of the driven shaft A'. The spider I together with the pinions $I^5$, $I^6$ and the gear wheels J, J' constitute a differential gearing for driving the shafts A and A' whenever the spider I is rotated, the gearing permitting, however, one of the shafts A or A' to rotate faster than the other when the vehicle turns around a corner or follows a sinuous track.

Between each gear wheel G and the power transmission member H is arranged a friction clutch K, preferably in the form of alternating rings K' and $K^2$ made of steel or other hard metal, and of which the rings K' are held on keys $K^3$ secured to or forming part of the gear wheel G, while the rings $K^2$ are engaged by keys $K^4$ bolted or otherwise fastened on the transmission member H. Normally the friction clutch rings K' and $K^2$ of each friction clutch K are pressed in firm contact with each other by the action of a spring L extending within the hollow bearing H' of the transmission member H, and coiled around a rod I⁷ secured to the corresponding lug I' of the spider I. Now one end of the spring L abuts against the lug I' while the other end of the spring L presses against the closed end of the bearing H', so that the transmission member H is pressed by the spring L toward the gear wheels G to hold the friction clutch rings K' and K² in firm contact with each other, so that the gear wheels G are normally connected with the transmission member H in such a manner that the latter is carried around by the gear wheels G, as hereinafter more fully described. The inner terminal A³ of the shaft A has a bearing in the inner end of the shaft A', plainly shown in Fig. 3, and the shaft A besides having a rotary motion is mounted to slide in the direction of its axis, to shift the transmission member H from the right to the left with a view to gradually release the friction clutches K whenever it is desired to decrease the speed of the shafts A and A'. For the purpose mentioned the shaft A is provided with a collar A⁴ engaging the hub H² of the transmission member H (see Fig. 3), and on the said shaft A is secured a cam disk N (see Figs. 2 and 7) in frictional contact with a cam collar N' attached to the bar E, and through which passes loosely the shaft A.

The cam disk N is provided with an arm N² pivotally connected by a link N³ (see Fig. 1) with a lever N⁴ fulcrumed at N⁵ on the main frame E². The lever N⁴ is pivotally connected by a link N⁶ with the operating lever O fulcrumed on the main frame E², and having a latch O' adapted to engage one of a series of notches on a segment O² secured to the main frame E². The latch O' is provided with a stem O³ adapted to be engaged by a lug O⁴ held on a foot lever O⁵ fulcrumed on the lever O and under the control of the operator. A spring O⁶ pressing the stem O³ normally holds the latch O' in engagement with the corresponding notch in the segment O². Now when the operator imparts a swinging motion to the foot lever O⁵ then the lug O⁴ acts on the stem O³ to swing the latch O' out of engagement with the segment O², thus unlocking the lever O. When the operator now presses the foot lever O⁵ in the direction of the arrow a', a swinging motion is given to the lever O in the same direction to cause the link N⁶, the lever N⁴ and link N³ to impart a swinging motion to the arm N² in the direction of the arrow b', whereby the cam disk N is turned, and in doing so it is shifted by the fixed cam N' in the direction of the arrow a', to move the shaft A in the same direction. When this takes place the collar A⁴ engages and shifts the hub H², thus moving the transmission member H from the right to the left away from the gear wheels G, so that the friction clutches K are more or less released according to the amount of movement given to the transmission member H. When the transmission member H is moved from the right to the left then the several springs L are compressed and when the operator releases the pressure on the foot lever O⁵ then the several parts are returned to their normal position by the action of the springs L, that is, the transmission member H is moved from the left to the right to firmly press the friction rings K' and K² in contact with each other, and at the same time the shaft A is returned from the left to the right by the hub H² pressing the collar A⁴. The return of the shaft A causes a return movement of the cam disk N, the arm N², link N³, lever N⁴, link N⁶ and lever O to normal position. The cam disk N is held against movement in the direction of the arrow c', on the shaft A, by abutting against a thrust bearing P interposed between the said cam disk N and the collar A⁵ attached to the shaft A. (see Fig. 7).

When the shaft F is driven from the motor F⁵ then the pinion F⁶ rotates the gear wheels G, and as the latter are practically locked to the transmission member H it is evident that the gear wheels G and consequently the transmission member H are carried around, whereby the spider I is carried around with the transmission member H, and the pinions I⁵, I⁶ rotate the gear wheels J, J', thus turning both shafts A, A' in the same direction and practically at the highest speed, as the motor F⁵ is run uniformly at the same rate of speed.

When it is desired to reduce the speed of the shafts A and A' and consequently that of the vehicle, the operator swings the lever O in the direction of the arrow a', as above described, so as to cause a shifting of the shaft A and the transmission member H from the right to the left, to partly release the friction clutches K, so that the gear wheels G rotate on their own axes besides carrying the transmission member H around, but the speed of the latter decreases as soon as the gear wheels G begin to rotate on their own axes. Thus by moving the lever O more or less in the direction of the arrow a', the transmission member H is more or less released by the friction clutches K from the gear wheels G, and consequently the latter revolve more or less freely at their own axes, and the transmission member H is carried around with less speed and consequently the shafts A and A' are rotated at a lower rate of speed.

Whenever a higher speed is desired, the operator releases the pressure on the lever O correspondingly, so that the springs L return the several parts and increase the friction between the friction rings K', K², of the several friction clutches K, to cause the transmission member H to rotate at a high rate of speed. The rotary motion of the shafts A and A', is transmitted by the universal joints B to the stub axle C and the wheels mounted thereon, to propel the vehicle in a forward direction.

In order to run the vehicle backward without reversing the motor $F^5$, the following arrangement is made: On each of the gear wheels G is secured or formed a pinion Q in mesh with a gear wheel R secured or formed on a friction drum S mounted to rotate loosely on the hollow shaft F, as plainly indicated in the drawings. The friction drum S is normally driven loosely from the gear wheels G, Q and R, and the peripheral surface of the said friction drum S is adapted to be engaged by a friction band S' to retard the rotary motion of the drum S or to bring the same to a complete standstill, if desired. Now when the drum S is retarded or brought to a standstill, then the gear wheel R is held against movement and consequently the pinion Q rolls off the gear wheel R, thus turning the wheel G in a reverse direction, whereby the transmission member H is also rotated in a reverse direction and with it the shafts A and A'. When this takes place, the vehicle wheels are rotated in the reverse direction and consequently the vehicle runs backward.

The friction band S' is secured at one end on a stud $S^2$ held in the casing $E^3$ inclosing the transmission gearing and attached to the main frame E, as shown in Fig. 4. The other end of the friction band S' is provided with a gear segment $S^3$ in mesh with a pinion $S^4$ secured on a shaft $S^5$ journaled in the casing $E^3$. On the outer end of the shaft $S^5$ is secured an arm T (see Fig. 1) connected by a link T' with an arm $T^2$ fulcrumed at $T^3$ on the main frame $E^2$ and provided with a stud $T^4$ extending into the elongated slot U' of a link U pivotally connected with the lever $N^4$ previously mentioned. Now when it is desired to reverse, the operator swings the lever O forward in the direction of the arrow $a'$ until the friction clutches K are completely released and the shafts A and A' come to a standstill, owing to the disconnection of the transmission member H from the gear wheels G by the friction clutches K. When this takes place the lever $N^4$ has pulled the link U a distance such that the outer end engages the stud $T^4$, and a further movement now given to the lever O in the direction of the arrow $a'$ causes the link U to impart a swinging motion to the arm $T^2$, so that the link T' imparts a swinging motion to the arm T, to rotate the shaft $S^5$ and the pinion $S^4$. Now as the pinion $S^4$ is in mesh with the segmental gear wheel $S^3$ on the friction band S', the latter is drawn in firm contact with the friction drum S to gradually retard the same, and to finally bring the said drum to a standstill. When this takes place the pinions Q of the gear wheels G roll off the now practically fixed gear wheel R, so that the gear wheels G are rotated in a reverse direction and consequently the transmission member H is turned in a reverse direction and with it the spider I, to reverse the differential gearing to rotate the shafts A and A' in a reverse or backward direction. When the operator releases the pressure on the foot lever $O^5$ then the several parts return by the action of the compressed springs L, as previously explained and the friction band S' opens up to release the friction drum S.

From the foregoing it will be seen that the friction devices K are completely released previous to drawing the band S' taut on the friction drum S, so that the vehicle first gradually comes to a standstill in a forward direction and then backs up with the motor $F^5$, in either case running at the same uniform speed and in the same direction.

Having thus described our invention, we claim as new and desire to secure by Letters Patent:

1. A power transmission mechanism, comprising a driving shaft, a driven shaft mounted to turn and to slide, a master pinion on the said driving shaft, a rotatable transmission member moving with the said driven shaft, a gear wheel in mesh with the said master pinion and mounted to turn loosely on the said transmission member, a friction clutch interposed between the said gear wheel and the said transmission member to rotate the latter, and a driving connection between the said transmission member and the driven shaft.

2. A power transmission mechanism, comprising a driving shaft, a driven shaft mounted to turn and to slide, a master pinion on the said driving shaft, a rotatable transmission member moving with the said driven shaft, a gear wheel in mesh with the said master pinion and mounted to turn loosely on the said transmission member, a friction clutch interposed between the said gear wheel and the said transmission member to rotate the latter, a driving connection between the said transmission member and the driven shaft, and a manually controlled shifting mechanism for shifting the said driven shaft and the said transmission member thereon, to release the said friction clutch more or less.

3. A power transmission mechanism, comprising a driving shaft, a driven shaft mounted to turn and to slide, a master pinion on the said driving shaft, a rotatable transmission member moving with the said driven shaft, a gear wheel in mesh with the said master pinion and mounted to turn loosely on the said transmission member, a friction clutch interposed between the said gear wheel and the said transmission member, to rotate the latter, means for rotating the driven shaft from the transmission member, a manually controlled shifting mechanism for shifting the said driven shaft and the said transmission member thereon to release the said friction clutch more or less, and springs pressing the said transmission member to return the latter and the driven shaft on releasing the said shifting mechanism.

4. A power transmission mechanism, comprising a driving shaft, a driven shaft mounted to turn and to slide, a master pinion on the said driving shaft, a rotatable transmission member moving with the said driven shaft, a gear wheel in mesh with the said master pinion and mounted to turn loosely on the said transmission member, a friction clutch interposed between the said gear wheel and the said transmission member to rotate the latter, a second driven shaft, and differential gearing driven by the said transmission member and connected with both driven shafts to rotate the same.

5. A power transmission mechanism, comprising a driving shaft, a driven shaft mounted to turn and to slide, a master pinion on the said driving shaft, a rotatable transmission member moving with the said driven shaft, a gear wheel in mesh with the said master pinion and mounted to turn loosely on the said transmission member, a friction clutch interposed between the said gear wheel and the said transmission member to rotate the latter, means for rotating the driven shaft from the transmission member and a manually controlled friction reversing device geared with the said gear wheel.

6. A power transmission mechanism, comprising a driving shaft, a driven shaft mounted to turn and to slide, a master pinion on the said driving shaft, a rotatable transmission member moving with the said driven shaft, a gear wheel in mesh with the said master pinion and mounted to turn loosely on the said transmission member, a friction clutch interposed between the said gear wheel and the said transmission member to rotate the latter, means for rotating the driven shaft from the transmission member, a manually controlled shifting mechanism for shifting the said driven shaft and the said transmission member thereon to release the said friction clutch more or less, and a manually controlled friction reversing device geared with the said gear wheel.

7. A power transmission mechanism, comprising a driving shaft, a driven shaft mounted to turn and to slide, a master pinion on the said driving shaft, a rotatable transmission member moving with the said driven shaft, a gear wheel in mesh with the said master pinion and mounted to turn loosely on the said transmission member, a friction clutch interposed between the said gear wheel and the said transmission member to rotate the latter, means for rotating the driven shaft from the transmission member, a manually controlled shifting mechanism for shifting the said driven shaft and the said transmission member thereon to release the said friction clutch more or less, and a manually controlled friction reversing device geared with the said gear wheel, the said manually controlled shifting mechanism and the said reversing device being actuated successively from a common lever.

8. A power transmission mechanism, comprising a driving shaft, a driven shaft mounted to turn and to slide, a master pinion on the said driving shaft, a rotatable transmission member moving with the said driven shaft, a gear wheel in mesh with the said master pinion and mounted to turn loosely on the said transmission member, a friction clutch interposed between the said gear wheel and the said transmission member to rotate the latter, means for rotating the driven shaft from the transmission member, a manually controlled shifting mechanism for shifting the said driven shaft and the said transmission member thereon to release the said friction clutch more or less, a manually controlled friction reversing device geared with the said gear wheel, a lever, a connection between the said lever and the said shifting mechanism, and a connection between the said lever and the said reversing device to actuate the latter from the said lever after the friction clutch has been completely released by the shifting mechanism.

9. A power transmission mechanism, comprising a driving shaft, a driven shaft mounted to turn and to slide, a master pinion on the said driving shaft, a rotatable transmission member moving with the said driven shaft, a gear wheel in mesh with the said master pinion and mounted to turn loosely on the said transmission member, a friction clutch interposed between the said gear wheel and the said transmission member to rotate the latter, means for rotating the driven shaft from the transmission member, a friction reversing device including a drum, a pinion in mesh with the said gear wheel, a friction band for the said drum, and means for operating the said friction band to retard the motion of the said drum.

10. A power transmission mechanism, comprising a driving pinion, a gear wheel in mesh with the pinion, a rotatable power transmission member on which the said gear wheel is mounted to rotate, a friction clutch interposed between the gear wheel and the said member, a slidable shaft carrying the said transmission member, and shifting means for shifting the said shaft to move the transmission member and control the said friction clutch.

11. A power transmission mechanism, comprising a driving pinion, a gear wheel in mesh with the pinion, a rotatable power transmission member on which the said gear wheel is mounted to rotate, a friction clutch interposed between the gear wheel and the said member, a slidable shaft carrying the said transmission member to shift the latter on shifting the said shaft, differential gearing connecting the said transmission member with the said shaft to drive the latter, and a second shaft also driven by the said differential gearing.

12. A power transmission mechanism, comprising a driving pinion, a gear wheel in mesh with the pinion, a rotatable power transmission member on which the said gear wheel is mounted to rotate, a friction clutch interposed between the gear wheel and the said member, a pinion on the said gear wheel, a manually controlled friction drum, and a gear wheel on the said friction drum in mesh with the said pinion on the gear wheel and in axial alinement with the said driving pinion.

13. A power transmission mechanism, comprising a driving pinion, a gear wheel in mesh with the pinion, a rotatable power transmission member on which the said gear wheel is mounted to rotate, a friction clutch member interposed between the gear wheel and the said member, a pinion on the said gear wheel, a manually controlled friction drum, a gear wheel on the said friction drum in mesh with the said pinion on the gear wheel and in axial alinement with the said driven pinion, and a manually controlled friction band for the said friction drum.

14. A power transmission mechanism, comprising a driving pinion, a gear wheel in mesh with the pinion, a rotatable power transmission member on which the said gear wheel is mounted to rotate, a friction-clutch interposed between the gear wheel and the said member, a shifting means for shifting the said power transmission member to control the said friction clutch, and a spring pressing the said power transmission member to return the same on releasing the said shifting means.

15. A power transmission mechanism, comprising a driving shaft, a pinion on said shaft, a gear wheel in mesh with the pinion, a rotatable power transmission member on which the said gear wheel is mounted to rotate, a friction clutch interposed between the gear wheel and the said transmission member, a shifting mechanism for shifting the said power transmission member to release the said friction clutch, a pinion on the said gear wheel, a friction drum mounted to rotate loosely on the driving shaft, a friction band for engaging the peripheral surface of the said drum, the said band being secured at one end to a fixed support and having a gear segment at its other end, a shaft mounted to turn and having an arm, the said shaft being provided with a pinion in mesh with the said gear segment and adapted when the shaft is turned to tighten the band on said drum, a lever, a connection between the lever and the shifting mechanism, and a connection between the said lever and the arm on the said last mentioned shaft to turn the latter.

In testimony whereof we have signed our names to this specification in the presence of two subscribing witnesses.

FREDERICK E. SEDDON.
WILLIAM H. DOUGLAS.

Witnesses:
Theo. G. Hoster,
Everard B. Marshall.